United States Patent [19]

Alsamarraie et al.

[11] Patent Number: 5,047,472

[45] Date of Patent: Sep. 10, 1991

[54] POLYPHENYLENE ETHER OR POLYPHENYLENE ETHER/POLYSTYRENE WITH POLYORGANOSILOXANE/POLYVINYL-BASED GRAFT POLYMER MODIFIERS

[75] Inventors: Muhanad A. Alsamarraie, Clifton Park; William R. Haaf, Voorheesville, both of N.Y.; Warren J. Peascoe, West Stockbridge; I-Chung W. Wang, Williamstown, both of Mass.

[73] Assignee: General Electric Company, Selkirk, N.Y.

[21] Appl. No.: 271,249

[22] Filed: Nov. 14, 1988

[51] Int. Cl.$^5$ .............................................. C08L 61/04
[52] U.S. Cl. .......................................... 525/68; 525/63; 525/391; 525/392; 525/393; 524/115; 524/268; 524/267; 524/414
[58] Field of Search ................. 525/63, 391, 392, 393, 525/479, 474, 68; 524/268, 269, 115, 414

[56] References Cited

U.S. PATENT DOCUMENTS

| | | | |
|---|---|---|---|
| 4,226,761 | 10/1980 | Cooper et al. | 525/63 |
| 4,564,653 | 1/1986 | Kamata et al. | 525/67 |
| 4,812,515 | 3/1989 | Kress et al. | 525/69 |

FOREIGN PATENT DOCUMENTS

| | | | |
|---|---|---|---|
| 0051471 | 5/1982 | European Pat. Off. | 525/66 |
| 0217257 | 4/1987 | European Pat. Off. | 525/475 |
| 0231776 | 8/1987 | European Pat. Off. | 525/63 |

*Primary Examiner*—Melvyn I. Marquis
*Assistant Examiner*—R. Dean, Jr.
*Attorney, Agent, or Firm*—Hedman, Gibson, Costigan & Hoare

[57] ABSTRACT

Thermoplastic molding compositions are provided which comprise a polyphenylene ether resin alone or in combination with a polystyrene resin modified with a multi-stage polyorganosiloxane/polyvinyl-based graft polymer which exhibit materially enhanced impact strength, flame resistance, moldability and flow properties and other desirable properties without showing surface mottling or a tendancy to delaminate.

44 Claims, No Drawings

POLYPHENYLENE ETHER OR POLYPHENYLENE ETHER/POLYSTYRENE WITH POLYORGANOSILOXANE/POLYVINYL-BASED GRAFT POLYMER MODIFIERS

CROSS-REFERENCE TO RELATED APPLICATIONS

This application is related to the following commonly owned, concurrently-filed U.S. Pat. applications:

| Ser. No. | SUBJECT MATTER | APPLICANT(S) |
| --- | --- | --- |
| 07/271,250 | Polyorganosiloxane/ polyvinyl-based Graft Polymers, Process and Thermoplastic Compositions Containing the Same | I-C.W. Wang |
| 07/271,223 Now U.S. Pat. No. 4,939,205 | Thermoplastic Molding Compositions Containing Polyorganosiloxane/ polyvinyl-based Graft Polymer Modifiers | J. L. DeRudder F. J. Traver I-C. W. Wang |
| 07/271,222 Now U.S. Pat. No. 4,927,880 | Low Gloss Molded Articles Using Polyorganosiloxane/ polyvinyl-based Graft Polymers | J. L. DeRudder H. Savenije I-C. W. Wang |
| | Polyorganosiloxane/ polyvinyl-based Graft (meth)- acrylate Polymers | M. A. Alsamarraie S. Y. Hobbs I-C. W. Wang V. H. Watkins |
| 07/271,247 | Polyester, Polycarbonate and/or Polyphenylene Ether with Polyorganosiloxane/polyvinyl- based Graft (meth)- acrylate Polymers | M. A. Alsamarraie S. Y. Hobbs I-C. W. Wang V. H. Watkins |
| 07/271,230 Now U.S. Pat. No. 4,939,206 | Flame Retardant Polyorganosiloxane- based Graft Polymers | I-C. W. Wang |
| 07/271,246 | Polycarbonate and Polyester Blends Modified with Polyorganosiloxane Graft Polymers Combined with Diene Rubber-based Graft Polymers | J. L. DeRudder I-C. W. Wang |
| 07/271,896 | Polyesters Modified with Polyorgano- siloxane/polyvinyl- based Graft Polymers | J. L. DeRudder I-C. W. Wang |

FIELD OF THE INVENTION

The invention relates to thermoplastic molding compositions comprising a polyphenylene ether resin alone or in combination with a polystrene resin and a polyorganosiloxane/polyvinyl-based graft polymer modifier which exhibit enhanced impact strength, weld line strength, flame resistance, surface appearance, moldability and flow properties, and other desirable properties without showing a tendency to delaminate.

BACKGROUND OF THE INVENTION

Polyphenylene ether (PPE) resin compositions alone or in blends with other resins are widely used because of their excellent properties. Polyphenylene ether resin compositions and mixtures thereof with a polystyrene resin are described for example in European Patent Application No. 0,260,552. It is disclosed therein that very desirable improvements in impact resistance, heat resistance, mechanical strength, surface appearance, and moldability and flow properties are achieved if an additive comprising a silicone-based graft copolymer is used. In particular, there is used a modifier comprising a polyorganosiloxane rubber substrate onto which is subsequently grafted a stage or stages comprising two different vinyl monomers. Also relevant is BASF, U.K. Patent Specification No. 1,590,549, especially Example 7, which describes a composition comprising 90 wt. percent of poly-2,6-dimethyl-1,4-phenylene oxide with polystyrene (Noryl® 731, General Electric Company) and 10 wt. percent of a silicone rubber graft polymer.

A novel polyorganosiloxane/polyvinyl-based graft polymer has now been discovered to be extremely useful, for example, as an impact modifier for such thermoplastic resins. It also demonstrates surprising and unexpected ability to provide improved flame retardant compositions based on such resins, while maintaining other properties at desirable levels. As will be shown, PPE has a 1/16" UL flammability rating of V-1; adding a silicone graft copolymer to improve impact, e.g., EPO 0,260,552, increases impact but maintains the flammability rating of V-1.

In the present invention, the polyorganosiloxane rubber substrate of the prior art is replaced by a co-homopolymerized network(s) of polyorganosiloxane/polyvinyl-based polymer(s) in a co-homopolymerization process. Polyorganosiloxane/polystyrene-based co-homopolymers are particularly preferred for use in the first stage of the graft polymers used in the present invention. The present invention uses graft polymers provided by subsequent graft polymerization of vinyl monomers (e.g. poly(methyl methacrylate), polystyrene or styrene/acrylonitrile copolymer) onto the polyorganosiloxane/polyvinyl substrate as described above.

This multi-stage graft polymer is usefully employed in the present invention as a superior modifier for thermoplastic molding compositions comprising polyphenylene ethers and mixtures thereof with polystyrene, and especially enhances the flame retardancy of such compositions. The molding compositions maintain many unique features of silicone rubber such as enhanced impact strength, particularly at low temperature, while maintaining other properties, such as weathering and thermal resistance. The flame-retardant embodiments are easily able to pass the stringent V-0 rating tests of Underwriter's Laboratory's Bulletin 94, while those of the prior art have difficulty in reaching the even less stringent V-1 rating.

SUMMARY OF THE INVENTION

According to the present invention, there are provided compositions comprising a polyphenylene ether resin (A) or a mixture (A-1) comprising (i) at least 35 parts per hundred by weight of mixture (A-1) of polyphenylene ether resin and (ii) a polystyrene resin and an effective modifying amount of a multi-stage polyorganosiloxane/polyvinyl-based graft polymer composition (B) comprising: (a) as a first stage, a polymeric co-homopolymerized substrate comprised of, in combination, an organosiloxane polymer; at least one vinyl-based polymer; and optionally units derived from a cross-linking agent or agents, units which serve as graft-linking agent or agents, units derived from a cross-linking agent or agents and units from the same or different agent or agents which serve as a graft-linking agent or agents, or a mixture of any of the foregoing units; and (b) at least one subsequent stage or stages graft polymerized in the presence of any previous stage(s) and which is comprised of a vinyl-based polymer.

Also contemplated by the invention are compositions as above defined wherein said subsequent stages comprise (b)(i) a second stage comprising at least one polymer which optionally includes units derived from a cross-linking agent or agents, units which serve as a graft-linking agent or agents, units derived from a cross-linking agent or agents and units from the same or different agent or agents which serve as a graft-linking agent or agents, or a mixture of any of the foregoing units; and (b)(ii) a third stage comprising at least one vinyl-based polymer which is the same as, or different than, said (b)(i) polymer.

DETAILED DESCRIPTION OF THE INVENTION

The polyphenylene ether resin (A) or (i) used in the invention is a homopolymer or copolymer represented by the formula

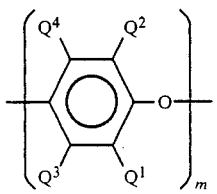

wherein $Q^1$ through $Q^4$ are selected independently of each other from the group consisting of hydrogen and hydrocarbon radicals and m denotes a number of 30 or more.

Examples of such polyphenylene ether resins include poly(2,6-dimethyl-1,4-phenylene)ether, poly(2,6-diethyl-1,4-phenylene)ether, poly(2,6-dipropyl-1,4-phenylene)ether, poly(2-methyl-6-ethyl-1,4-phenylene)ether, poly(2-methyl-6-propyl-1,4-phenylene)ether, poly(2-ethyl-6-propyl-1,4-phenylene)ether, copolymer of (2,6-dimethyl-1,4-phenylene)ether with (2,3,6-trimethyl-1,4-phenylene)ether, copolymer of (2,6-diethyl-1,4-phenylene)ether with (2,3,6-trimethyl-1,4-phenylene)ether, and copolymer of (2,6-dimethyl-1,4-phenylene)ether with (2,3,6-triethyl-1,4-phenylene)ether. Of these polymers, preferred are poly(2,6-dimethyl-1,4-phenylene)ether and a copolymer of (2,6-dimethyl-1,4-phenylene)ether with (2,3,6-trimethyl-1,4-phenylene)ether, and particularly preferred is poly(2,6-dimethyl-1,4-phenylene)ether. These polyphenylene ether resins have compatibility with polystyrene resins in any mixing ratio. There is no particular restriction on the polymerization degree of the polyphenylene ether resin used in the invention, but it is preferred to use a resin having a reduced viscosity of 0.3 to 0.7 dl/g measured in chloroform at 25° C. Resins having a reduced viscosity less than 0.3 dl/g tend to exhibit low heat stability while resins having a reduced viscosity exceeding 0.7 dl/g tend to have inferior moldability. The above defined polyphenylene ether resins may be used alone or in combination.

The polystyrene resin (ii) used in the invention is a homopolymer derived from an aromatic vinyl monomer represented by the formula

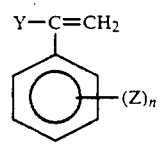

wherein Y denotes hydrogen or an alkyl of 1 to 4 carbon atoms, Z denotes a halogen or an alkyl of 1 to 4 carbon atoms, and n denotes a number of 0 or 1 to 4; or is a copolymer derived from at least 50 percent by weight of said aromatic vinyl monomer and another vinyl monomer copolymerizable therewith as well as grafts of styrene onto a rubber or mixtures thereof. Examples of such polystyrene resins include polystyrene, polychlorostyrene, polybromostyrene, poly-alpha-methylstyrene, styrene/acrylonitrile copolymer, styrene/methyl methacrylate copolymer, styrene/maleic anhydride copolymer, styrene/maleimide copolymer, styrene/N-phenylmaleimide copolymer, and styrene/acrylonitrile/alpha-methylstyrene terpolymer. In particular, polystyrene is prefered.

The multi-stage graft polymer of the present invention is made sequentially by a process which begins with a co-homopolymerization step.

Co-homopolymerization refers to a polymerization step where two distinct polymerization mechanisms are effected concurrently, including simultaneously. In particular, the first stage co-homopolymerization may encompass a siloxane polymerization (e.g. ring opening and condensation mechanism) in conjunction with a concurrent vinyl polymerization. The discrete mechanisms are not seen as competing with each other; rather, two homopolymers are concurrently produced, each retaining its own network structure.

This is evidenced by the two distinct glass transition temperatures which can be detected by differential scanning calorimetry (DSC). Preferably, the product of the co-homopolymerization process is rubbery instead of a resin-like powder.

Subsequent to the co-homopolymerization of the siloxanes and vinyl-based monomers of the first step, at least one additional graft polymerization process is utilized to achieve the multi-stage polyorganosiloxane/polyvinyl-based graft polymers of the invention.

The subsequent graft polymerization is preferably of at least one vinyl aromatic type monomer or a (meth)acrylate type monomer. It has been found that a polystyrene, a styrene/divinylbenzene copolymer, or an alkenyl aromatic/minor proportion of a (meth)acrylate copolymer is particularly effective as the second stage graft polymer or copolymer, or as the outer most stage when intermediary stages are optionally utilized.

The foregoing polyorganosiloxane/polyvinylbased graft polymer can be isolated and utilized as, for example, an impact strength modifying agent for thermoplastic resins as will be discussed in detail below.

Additional cross-linking and/or graft-linking agent(s) can be utilized in this initial stage to provide co-homopolymerized networks from both polymeric constituents which provide greater rubber integrity.

The first stage rubbery substrate is provided by a series of sequential processing steps. In a premixing step, the ingredients required for the co-homopolymerization of the organosiloxane(s) and vinyl monomer(s) are premixed with water and suitable cross-linker(s), graft-linker(s), initiator(s) and surfactant(s). The premixed ingredients are homogenized by conventional means. The co-homopolymerization reactions may begin at this early stage of the process, but these reactions are generally slow at room temperature. The homogenized reactants may be directed to a reactor vessel, typically stainless steel or glass flasks under a nitrogen blanket. Heat is applied to facilitate the reaction. For typical 5 to 50 gallon stainless steel reactors, a 3 to 6 hour residence time at 75° C. to 90° C. is adequate to complete the co-homo-polymerizations. Cooling for 2 to 6 hours will typically reduce the temperature to at least room temperature where the reaction mass can be held for 3 to 72 hours. Cooling to lower temperatures (e.g. 5° C.) may be sometimes preferred since this may enhance the properties of the formed polyorganosiloxane/polyvinyl substrate.

Cooling to room temperature or lower allows the polyorganosiloxane portion to build molecular weight, thereby minimizing the extractable silicone rubber fragments and optimizing physical properties of the product for certain applications. Generally, lower temperatures are preferred when it is desired to optimize the elasticity of the formed polyorganosiloxane/polyvinyl substrate.

The initiator for the siloxane component of the co-homopolymerization can be any ionic ring opening type initiator when cyclic siloxanes are utilized, such as alkylarylsulfonic acids, alkyldiaryldisulfonic acids, alkylsulfonic acids, or the like. The best suited example is dodecylbenzenesulfonic acid which can act as an initiator and at the same time as an emulsifier. In some cases, the joint use of a metal salt of an aforementioned sulfonic acid is also preferred.

The initiator for the styrenic or other vinyl monomers in the co-homopolymerization process can be an organic soluble radical initiator, such as azobisisobutyronitrile (AIBN) and the organic peroxides, e.g. benzoyl peroxide, dichloro benzoyl peroxide, and tert-butyl perbenzoate. Also suitable are water soluble radical initiators such as the persulfates. Although it is possible to charge this type of initiator at the beginning of the process, it is preferred that it be charged continuously or incrementally during the co-homopolymerization period. Since persulfate is less stable in the acid conditions of the siloxane polymerization, it is preferred that the persulfate be added over time to keep the vinyl polymerization running. Particle size, pH and total solids measurements can be readily monitored at this stage of the process. A latex rubber emulsion prepared as described above will generally contain particles having an average diameter of 100 to 800 nanometers and preferably 150 to 400 nanometers. The particle size is particularly influenced by the homogenization pressure (and the number of passes through the homogenizer) and the composition of the reaction ingredients. A pressure range of 2000 to 12000 psi is typical, and 3000 to 9000 psi is preferred. Multiple passes through the homogenizer may be preferred, but on a large scale, a single pass may be most practical.

The foregoing reaction steps must be followed by a suitable neutralization process to provide the products of the invention. The main object of the neutralization is to quench the siloxane polymerization. This is accomplished by adding a caustic solution such as sodium hydroxide, potassium hydroxide, potassium or sodium carbonate, sodium hydrogen carbonate, triethanolamine or triethylamine. The pH of the reaction solution may be raised from a level of 1 to 3 to a pH of at least about 6.5, and preferably 7 to 9.

It is often desirable to add additional soap or surfactant to the emulsion formed at the end of the first stage, prior to the neutralization step. Additional surfactant tends to facilitate avoidance of premature agglomeration or flocculation of the co-homopolymerized rubber in the quench step.

The foregoing co-homopolymerization process provides a rubbery network composed of a polyorganosiloxane/polyvinyl substrate. This substrate is the first stage of the graft polymer of the present invention. The next stage involves the graft polymerization of additional vinyl-functional moieties onto graft sites provided by the rubbery substrate particles in the latex formed in the first stage. Subsequent additional stages are optional but may be preferred for certain applications.

The grafted polymers will preferably be the product of a vinyl polymerization process. Suitable vinyl monomers for graft polymerization include without limitation: alkenyl aromatic compounds such as styrene, divinylbenzene, alpha-methylstyrene, vinyl toluene, halogenated styrene and the like; methacrylates such as methyl methacrylate and 2-ethylhexyl methacrylate; acrylates such as acrylic acid, methyl acrylate, ethyl acrylate and butyl acrylate; vinyl cyanide compounds such as acrylonitrile and methacrylonitrile; olefins such as ethylene, propylene, butadiene, isoprene, and chloroprene; and other vinyl compounds such as acrylamides, N-(mono or disubstituted alkyl)acrylamides, vinyl acetate, vinyl chloride, vinyl alkyl ethers, allyl (meth)acrylate, triallyl isocyanurate, ethylene dimethacrylate, diallyl maleate, maleic anhydride; maleimide compounds such as maleimide or N-phenyl (or alkyl) maleimide; and mixtures of these monomers.

The vinyl polymerization is accomplished in an emulsion; therefore, water soluble initiators are suitable, e.g., potassium persulfate, sodium persulfate and ammonium persulfate. It is practical to add the initiator at the beginning of this step, prior to charging the vinyl monomer for the second stage polymerization. Other Redox initiator systems, such as cumene hydroperoxide/ferrous sulfate/glucose/sodium pyrophosphate, can also be utilized at this stage as well as other organic peroxides.

Sequential multi-stage polymerization processes of this type are sometimes referred to as core-shell processes. It is preferred, however, to describe them as multi-stage graft polymerization processes wherein the initial stage provides a co-homopolymerized organosiloxane/vinyl-based substrate. This substrate may have sufficient grafting sites for a second or subsequent stage to be grafted thereto. Grafted polystyrene, poly(meth)acrylate, stryene/acrylonitrile or styrene/ divinylbenzene copolymer as the outermost stage is preferred, yet many other intermediary stages such as a butyl acrylate stage are also contemplated. Furthermore, the grafting of additional stages of the same or different kinds is also possible.

In general, the first stage substrate comprising the co-homopolymerized polyorganosiloxane/ polyvinyl-based substrate will comprise approximately 5 to 95 weight percent of the total graft polymer based upon the weight of the first stage substrate and the subsequent stage or stages taken together. Preferably, the first stage substrate will comprise approximately 30 to 90 weight percent on the same basis. Correspondingly, the subsequent stages, comprising the additional grafted vinyl polymer will comprise approximately 95 to 5 weight percent and preferably approximately 70 to 10 weight percent on the same basis. In the multi-stage systems, preferably, the ratio of first stage substrate polymer (B)(a) to second stage polymer (b)(i) is 10:90 to 90:10 and the amount of third stage polymer (b)(ii) comprises from about 10 to about 90 parts by weight per 100 parts by weight of (B)(a), (b)(i), and (b)(ii) combined.

The organosiloxanes useful in the first stage co-homopolymerization are any of those known to produce silicone elastomers and may include those which are hydroxy-, vinyl-, hydride- or mercapto-end capped linear organosiloxane oligomers.

The polyorganosiloxanes illustratively will be comprised primarily of units of the formula $$R_nSiO_{(4-n)/2}$$

wherein R is hydrogen or a monovalent hydrocarbon radical of about 1 to 16 carbon atoms and n is 0, 1 or 2.

Preferred among the organosiloxanes are those in cyclic form having three or more siloxane units, and most preferred those having three to six units. Such organosiloxanes include without limitation, for example, hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, tetramethyltetravinylcyclotetrasiloxane and octaphenylcyclotetrasiloxane. These or similar organosiloxanes may be used alone or in combination.

The vinyl monomers useful in conjunction with the co-homopolymerization of organosiloxanes in the first stage are preferred to be alkenyl aromatic compounds such as styrene, divinylbenzene, alpha-methylstyrene, vinyl toluene, vinyl naphthalene, vinyl anthracene, and halogenated styrene or its derivatives. Other suitable vinyl monomers include acrylic acids and acrylates such as methyl-, ethyl-, allyl-, or butyl acrylate; methacrylates such as methyl methacrylate or 2-ethylhexyl methacrylate; vinyl cyanides such as acrylonitrile or methacrylonitrile; olefins such as ethylene, propylene, butadiene, isoprene, chloroprene; and other vinyl compounds such as vinylimidazole, 5-vinyl-2-norbornene, vinyl pyridine, vinyl pyrolidine, vinyl acetate, vinyl alkyl ethers, vinyl chloride, vinyl furan, N-vinyl carbazole, allyl (meth)acrylate, triallyl isocyanurate, ethylene di(meth)acrylate, butylene di(meth)acrylate, diallyl maleate, maleic anhydride; maleimide compounds such as maleimide or N-phenyl (or alkyl) maleimides; acrylamides; N-(mono or di-substituted) acrylamides; and mixtures of any of these monomers. In general, any rubbery or glassy vinyl type monomer may be used which can be mixable with the organosiloxanes. Typically, the vinyl component of the first stage co-homopolymer will be present in an amount of approximately 3 to 97 weight percent, and correspondingly, the organosiloxane component will be present in an amount of approximately 97 to 3 weight percent. Preferably, the vinyl-based component will comprise approximately 5 to 45 weight percent of the first stage of the co-homopolymerized substrate.

The cross-linker composition used in conjunction with the organosiloxane component of the present compositions can have the general formula $$R^2{}_n-Si(OR^1)_{4-n}$$

wherein n is 0, 1, or 2, preferably 0 or 1, and each $R^1$ independently represents hydrogen or a monovalent hydrocarbon radical selected from among alkyl or aryl radicals having 1 to 16 carbon atoms, preferably methyl, ethyl and phenyl. $R^2$ can be the same as $R^1$ or can be a vinyl, alkenyl, thio, or (meth)acryloxyalkyl functional radical. When $R^2$ is a vinyl, alkenyl, or acryloxyalkyl radical and n is 1, the cross-linker compound can also act as a graft-linker.

A preferred cross-linker compound is tetraethoxysilane. A combination cross-linking and graft-linking compound is vinyltriethoxysilane. Another suitable choice is gamma-methacryloxypropyltrimethoxysilane.

The multi-stage polyorganosiloxane/polyvinylbased graft product of the present invention can be isolated by conventional means such as hot solution coagulation. For example, an electrolytic solution of about 0.5 to 5 percent aluminum sulfate or magnesium sulfate in water can be prepared and heated to about 75° to 95° C. When the latex is added, with agitation, the graft product will precipitate and can be held at elevated temperature for about 10 minutes whereupon it may be filter washed. Commercial latex isolation techniques such as spray dryers may also be utilized.

In another feature of the invention, platinum or platinum compounds are utilized in conjunction with silicone graft polymer compositions in order to enhance further the flame retardance of the latter. As flame retarding additives, there may optionally be utilized the reaction product of chloroplatinic acid and organosilicon compounds as described in U.S. Pat. No. 3,220,972. Another platinum compound is seen in U.S. Pat. No. 3,775,452 describing platinum-containing organopolysiloxanes.

The flame retardancy of the compositions can also be enhanced further with effective amounts, e.g., between about 1 and 30 parts by weight per 100 parts by weight of resin of a flame retardant agent as component (C), e.g., elementary red phosphorous, phosphorous compounds, halogen compounds, nitrogen compounds, antimony oxide, zinc oxide, mixtures thereof and the like.

In addition, reinforcing fillers as component (D); silicone fluids as component (E); dyes and colored pigments; heat stabilizers; thermooxidative stabilizers and UV stabilizers; waxes, lubricants and processing assistants which ensure trouble-free extrusion and injection molding; and antistatic agents may be added to the molding compositions according to the invention.

The reinforcing filler can be comprised of any organic or inorganic fillers including but not limited to glass fiber, carbon fiber, aramid fiber, metallic fiber, glass beads, glass flakes, calcium carbonate, talc, mica, aluminum oxide, boron nitride, beryllium oxide, calcium silicate, silica including fumed silica, clay or metal powders or whiskers. These reinforcing fillers (D) have the effects of reinforcing mechanical properties, especially rigidity and resistance, and may be use alone or in combination.

The preferred silicone fluid is a methylphenyl silicone fluid high in phenyl content.

Conventional processes for mixing thermoplastic polymers can be used for the manufacture of molding compositions within the invention. For example, the compositions can be manufactured by using any suitable mixing equipment, e.g., cokneaders or extruders. The mixing temperatures are in general from 200° to 370° C., preferably from 230° to 345° C. The polymers are fused and thoroughly mixed, with or without the other additives described.

The addition of the graft polymers described above does not adversely influence the processing stability of the thermoplastically processable plastics material. The processing of the new molding compositions by extrusion or injection molding is preferably carried out at from 230° to 345° C., with the mold, in the latter case, being at from 50° to 150° C.

The amounts of components (A) or (A-1) and (B) can vary broadly, but will usually be in the range of from about 95 to about 50 parts by weight of (A) or (A-1) to from about 5 to about 50 parts by weight of (B), per 100 parts by weight of (A) or (A-1) and (B) together. Preferred amounts are from about 95 to about 75 parts by weight of (A) or (A-1) to from about 5 to about 25 parts by weight of (B) per 100 parts by weight of (A) or (A-1) and (B) combined. Most preferred amounts are from about 95 to about 85 parts by weight of (A) or (A-1) to about 5 to about 15 parts by weight of (B), per 100 parts by weight of (A) or (A-1) and (B) combined.

Where the composition comprises (A-1) and (B) combined, the amounts of (i) polyphenylene ether resin and (ii) polystyrene resin can vary broadly, but the amount of (i) will be at least 35 parts per hundred by weight of mixture (A-1), and the amount of (ii) will be correspondingly from about 65 to about 1 part per hundred by weight of mixture (A-1). Preferably, the amount of (i) will be at least 50 parts by weight of mixture (A-1) and preferably the amount of (ii) will be correspondingly 50 to about 1 part per hundred by weight of mixture (A-1).

DESCRIPTION OF THE PREFERRED EMBODIMENTS

The following examples illustrate the invention without limitation. All parts given are by weight unless otherwise indicated. Impact strengths are reported as notched Izod (IZOD) (ASTM D-256) and Drop-Dart Energy to Fracture (DYN Efract) (ASTM D-3763). Tensile strengths are reported as Tensile Yield Strength (TYS) and Tensile Elongation Break (TE) (ASTM D-638). Molding properties are reported as Flow Channel Length (FC) (GE method) and Melt Viscosity (MV@620° F) (GE method). Flammability is reported as Average Self Extinguishing Time (UL 94) (Underwriter's Laboratory Bulletin 94) and Heat Deflection Temperature (HDT) (ASTM D-648).

A single slash is used between monomers of a single stage and a double slash or a hyphen is used as a shorthand method of indicating separation between stages. The first stage to be polymerized is written before the double slash or hyphen, and subsequent stages are written subsequently.

The following abbreviations are used in accordance with the following Table in the following examples.

Si = general term for organosiloxanes include D4, VMD4, VTMOS, TEOS, APTMOS, etc.
D4 = octamethylcyclotetrasiloxane
VMD4 = tetravinyltetramethylcyclotetrasiloxane
VTMOS = vinyltrimethoxysilane
TEOS = tetraethoxysilane
APTMOS = gamma-methacryloxypropyltrimethoxysilane
S = styrene
DVB = divinylbenzene
PS = polystyrene
AN = acrylonitrile

PROCEDURE A

Octamethylcyclotetrasiloxane (D4), 82.4 parts, tetravinyltetramethylcyclotetrasiloxane (VMD4), 4.6 parts, tetraethoxysilane (TEOS), 10.2 parts, methacryloxypropyltrimethoxysilane (APTMOS), 1.43 parts, and an optional chloroplatinic acid catalyst solution containing 35,000 ppm platinum prepared in accordance with U.S. Pat. No. 3,220,972, 0.12 part, is admixed with 6.67 parts of styrene (S) and 0.13 part of divinylbenzene (DVB). The organic mixture is then stirred into 1.33 parts of dodecylbenzenesulfonic acid which is predissolved in 400 parts of deionized water. The final mixture is passed through a homogenizer at 6000–8000 psi and generates a crude emulsion.

The crude emulsion is polymerized by heat alone at 75° for 6 hours with $K_2S_2O_8$ being added incrementally over the first four hours. The crude emulsion is then cooled down to and held at room temperature overnight before neutralization to pH 7.35 by the addition of 4.67 parts of 15 percent aqueous potassium carbonate solution. Optionally, 3.3 parts of 10 percent aqueous GAFAC® RE 610 surfactant solution is stirred into the latex prior to neutralization to prevent undesired flocculation during pH adjustment. The substrate isolated for characterization prior to second stage grafting has a gel content of 85 percent, and the degree of swelling is 9.6. The sol fraction, which is extracted from the substrate and is composed of 99 percent organosiloxanes as determined by H-NMR, has 89 percent free silicone fluids of Mw/Mn of 56K/26K and 11 percent low MW linear or cyclic siloxanes by GPC. The rubber particle size in its latex form is 213 nm in diameter.

30 parts of styrene and 0.3 part of divinylbenzene are emulsion graft-polymerized onto 70 dry parts of the silicone/polystyrene substrate using potassium persulfate as an initiator at 75° C. The final product, CSiM, has a second stage graft efficiency of 78.7 percent based on MEK Soxhlet extraction and sol fraction as analyzed by M-NMR.

EXAMPLE 1

A dry blend of 95 parts of polyphenylene ether (PPE) (0.46 IV) and 5 parts of CSiM modifier ((Si/PS)-S wt. ratio of 70:30) prepared by the method of Procedure A is mixed and extruded at 608° F. set, pelletized, and molded at 610° F. set, 670° F. melt and 210° F. mold. Izod bars are tested, and flammability tests are conducted. Mottling and delamination are not seen. Properties are summarized in Table 1.

COMPARATIVE EXAMPLE 1A*

Polyphenylene ether (0.46 IV) is extruded and molded under the same conditions as in Example 1. Izod bars are tested, and flammability studies are conducted. Properties are summarized in Table 1.

EXAMPLE 2

A dry blend of 100 parts of polyphenylene ether (0.40 IV) and 5 parts of CSiM modifier ((Si/PS)-S wt. ratio of 70:30) prepared by the method of Procedure A is mixed and extruded at 572°–600° F. set and 0–15 in. Hg vacuum, pelletized, and molded at 580°–615° F. set, 190°–210° F. mold. Izod bars are tested, and flammability tests are conducted. Mottling and delamination are not seen. Properties are illustrated in Table 1.

EXAMPLE 3

The procedure of Example 2 is followed substituting a dry blend of 100 parts of polyphenylene ether (0.40 IV), 5 parts of CSiM modifier ((Si/PS)-S wt. ratio of 70:30) prepared by the method of Procedure A and 5 parts of methylphenyl silicone fluid (SF-1154). Mottling and delamination are not seen. Properties are summarized in Table 1.

EXAMPLE 4

A dry blend of 19 parts of polyphenylene ether (0.40 IV), 76 parts of polyphenylene ether (0.26 IV), and 5 parts of CSiM modifier ((Si/PS)-S wt. ratio of 70:30) prepared by the method of Procedure A is mixed, extruded at 616° F.–645° F. melt and 20 in. Hg vacuum, pelletized, and molded at 611° F.–630° F. melt, 190° F. mold. Izod bars are tested, and flammability tests are conducted. Mottling is not seen and delamination is very slight. Properties are summarized in Table 1.

EXAMPLE 6

The procedure of Example 4 is followed substituting a dry blend of 17 parts of polyphenylene ether (0.40 IV), 68 parts of polyphenylene ether (0.26 IV), and 15 parts of CSiM modifier ((Si/PS)-S wt. ratio of 70:30) prepared by the method of Procedure A. No mottling and very slight delamination are seen. Properties are summarized in Table 1.

As evidenced by Examples 1, 2, 3, 4, 5 and 6 impact strength is improved by the addition of the polyorganosiloxane/polyvinyl-based graft polymer modifier to the PPE resin. Examples 1, 2, 3, 4 and 5 demonstrate that flame retardancy is improved as well. Example 6 and Comparative Example 4A* indicate that maximum flame retardancy is reached when the amount of CSiM is from 5 to less than 15 parts per 100 by weight of the blend. Furthermore, the addition of methylphenyl silicone fluid to the former blends tends further to increase impact strength, melt flowability and flame retardancy.

TABLE 1

| Evaluation of CSiM In PPE | 1 | 1A* | 2 | 3 | 4 | 4A* | 5 | 6 |
|---|---|---|---|---|---|---|---|---|
| PPE (0.46 IV) | 95 | 100 | — | — | — | — | — | — |
| PPE (0.40 IV) | — | — | 100 | 100 | 19 | 20 | 18 | 17 |
| PPE (0.26 IV) | — | — | — | — | 76 | 80 | 72 | 68 |
| CSiM $^A$ | 5 | — | 5 | 5 | 5 | — | 10 | 15 |
| Silicone Fluid $^B$ | — | — | — | 5 | — | — | — | — |
| Izod $^C$ | 1.9 | 0.4 | 2.1 | 4.7 | 1.8 | 0.5 | 2.7 | 3.9 |
| DYN-Efract $^D$ | 542 | 296 | 324 | 486 | 102 | 13 | 108 | 233 |
| FC $^E$ | 9.9 | 8.8 | — | — | — | — | — | — |
| MV @ 620° F. 100/sec $^F$ | — | — | 3930 | 3400 | — | — | — | — |
| MV @ 620° F. 1500/sec $^F$ | — | — | 1770 | 1410 | 2070 | 1560 | 2270 | 2380 |
| UL94 ⅛" $^G$ | | | | | | | | |
| Avg | 2.8 | 3.4 | 1.3 | 2.2 | 2.2 | 7.6 | 2.1 | 10.0 |
| Max | 4 | 5 | 2 | 6 | 5 | 16 | 5 | 47 |
| % Drip | — | — | — | — | 0 | 0 | 0 | 0 |
| Rating | V0 | V0 | V0 | V0 | V0 | V1 | V0 | Fail |
| UL94 1/16" $^G$ | | | | | | | | |
| Avg | 3.4 | 8.6 | 5.6 | 3.4 | 4.4 | 9.9 | 4.8 | 27.6 |
| Max | 5 | 29 | 12 | 7 | 8 | 23 | 9 | 75 |
| % Drip | — | — | — | — | 0 | 0 | 0 | 20 |
| Rating | V0 | V1 | V1 | V0 | V0 | V1 | V0 | Fail |
| HDT $^H$ | 353 | 355 | 349 | 334 | 347 | 364 | 352 | 346 |
| TYS $^I$ | 9710 | 10900 | 9650 | 9090 | 9870 | 10260 | 8660 | 7730 |
| TE $^J$ | 87 | 60 | 35 | 46 | 16 | 9 | 19 | 24 |

$^A$ CSiM, (Si/PS)-S wt. ratio of 70:30, Procedure A
$^B$ SF-1154 - Methylphenyl silicone fluid high in phenyl content (SPD-Waterford)
$^C$ Notched Izod Impact Strength (ft-lbs/in) ⅛" × ½" × 2½" specimen (ASTM D-256)
$^D$ Drop-Dart Energy to Fracture (in - lbs) ⅛" × 4" disc specimen (ASTM D-3763)
$^E$ Flow Channel Length at molding temperature and 10,000 psi pressure (in) ⅛" × ¼" × length mold (GE method)
$^F$ Melt Viscosity @ 620° F., 100 sec$^{-1}$/1500 sec$^{-1}$ (poise) capillary L/D = 20 (GE method)
$^G$ Average Self Extinguishing Time (sec), Maximum Flameout Time (sec), V-Rating ⅛" × ½" × 5" and 1/16" × ½" × 5" specimens (Underwriters' Laboratories Bulletin 94)
$^H$ Heat Deflection Temperature (°F.) ¼" × ½" × 5" specimen (ASTM D-648)
$^I$ Tensile Yield Strength (psi) ⅛" × 8½" ASTM tensile specimen (ASTM D-638)
$^J$ Tensile Elongation at Break (%) ⅛" × 8½" ASTM tensile specimen (ASTM D-638)

COMPARATIVE EXAMPLE 4A*

The procedure of Example 4 is followed substituting a dry blend of 20 parts of polyphenylene ether (0.40 IV), 80 parts of polyphenylene ether (0.26 IV), and no modifier. Properties are summarized in Table 1.

EXAMPLE 5

The procedure of Example 4 is followed substituting a dry blend of 18 parts of polyphenylene ether (0.40 IV), 72 parts of polyphenylene ether (0.26 IV), and 10 parts of CSiM modifier ((Si/PS)-S wt. ratio of 70:30) prepared by the method of Procedure A. No mottling and very slight delamination are seen. Properties are summarized in Table 1.

EXAMPLE 7

A dry blend of 75 parts of polyphenylene ether (0.40 IV), and 25 parts of CSiM modifier ((Si/PS)-S wt. ratio of 70:30) prepared by the method of Procedure A is mixed, extruded at 518°–536° F. set with no vacuum (Brabender), and molded at 580° F. set, 190° F. mold. Slight delamination is seen. Properties are summarized in Table 2.

EXAMPLE 8

The procedure of Example 7 is followed substituting a dry blend of 50 parts of polyphenylene ether (0.40 IV) and 50 parts of CSiM modifier ((Si/PS)-S wt. ratio of 70:30) prepared by the method of Procedure A. Severe delamination is seen. Properties are summarized in Table 2.

EXAMPLE 9

A dry blend of 25 parts of polyphenylene ether (0.40 IV) and 75 parts of CSiM impact modifier ((Si/PS)-S wt. ratio of 70:30) prepared by the method of Procedure A is mixed. Attempts are made to extrude the mixture at temperatures ranging from 518°-608° F. and screw RPM ranging from 25-160. Material is hand-fed in an attempt to control shear heating. The mixture can not be extruded under any conditions and exhibits melt fracture, gassing, discoloration, delamination and brittleness.

EXAMPLE 10

A dry blend of 90 parts of polyphenylene ether (0.46 IV) and 10 parts of CSiM modifier ((Si/PS)-S wt. ratio of 70:30) prepared by the method of Procedure A is mixed, extruded, pelletized and molded. Mottling and delamination are not seen. Properties are summarized in Table 2.

The Examples show that high concentrations of CSiM in polyphenylene ether resins produce increases in impact resistance but are ineffective in flame resistance. When Examples 7, 8 and 9 are compared with Examples 1, 4, 5, and 6 (Table 1) and Example 10 and in light of the appearance of delamination, the compatability of CSiM in PPE appears to be between 5 and 50 percent for impact modification and 5 and 15 percent for flame retardancy enhancement.

TABLE 2

High CSiM Content Blends of PPE and CSiM

| Example | 7 | 8 | 9 | 10 |
|---|---|---|---|---|
| PPE (0.46 IV) | — | — | — | 90 |
| PPE 40 IV) | 75 | 50 | 25 | — |
| CSiM | 25 | 50 | 75 | 10 |
| Izod $^B$ | 7.8 | 5.9 | * | 9.83 |
| DYN-Efract $^C$ | 259 | 77 | * | — |
| MV @ 620° F. $^D$ | | | | |
| 100/sec | 5360 | 14920 | * | — |
| 1500/sec | 2000 | 1720 | * | — |
| UL94 ⅛" $^E$ | | | | |
| Avg | Burns | Burns | * | — |
| Max | Burns | Burns | * | — |
| Rating | Fails | Fails | * | — |
| UL94 1/16" $^E$ | | | | |
| Avg | Burns | Burns | * | — |
| Max | Burns | Burns | * | — |
| Rating | Fails | Fails | * | — |
| HDT $^F$ | 324 | 259 | * | — |
| TYS $^G$ | 6230 | 3750 | * | 8227 |
| TE $^H$ | 39 | 33 | * | 147 |
| Tens @ Break $^I$ | — | — | — | 10252 |
| Delamination | slight | severe | * | none |

$^A$ (Si/PS)-S wt. ratio of 70:30, Procedure A
$^B$ Notched Izod Impact Strength (ft-lbs/in) ⅛" × ½" × 2½" specimen (ASTM D-256)
$^C$ Drop-Dart Energy to Fracture (in - lbs) ⅛" × 4" disc specimen (ASTM D-3763)
$^D$ Melt Viscosity @ 620° F, 100 sec$^{-1}$/1500 sec$^{-1}$ (poise) capillary L/D = 20 (GE method)
$^E$ Average Self Extinguishing Time (sec), Maximum Flameout Time (sec), V-Rating ⅛" × ½" × 5" and 1/16" × ½" × 5" specimens (Underwriter's Laboratories Bulletin 94)
$^F$ Heat Deflection Temperature (°F.) ⅛" × ½" × 5" specimen (ASTM D-648)
$^G$ Tensile Yield Strength (psi) ⅛" × 8½" ASTM tensile specimen (ASTM D-638)
$^H$ Tensile Elongation at Break (%) ⅛" × 8½" ASTM tensile specimen (ASTM D-638)
$^I$ Tensile Strength at Break (psi) ⅛" × 8½" ASTM tensile specimen (ASTM D-638)
* Could not be extruded under any conditions

EXAMPLE 11

A dry blend of 75 parts of polyphenylene ether (0.46 IV), 20 parts of polystyrene (Huntsman ® 1897 Grade High Impact Polystyrene), and 5 parts of CSiM modifier ((Si/PS)-S wt. ratio of 70:30) prepared by the method of Procedure A is mixed, extruded at 580° F. set, pelletized, and molded at 590° F. set, 636° F. melt and 190° F. mold. Izod bars are tested, and flammability tests are conducted. No mottling or delamination is seen. Properties are summarized in Table 3.

COMPARATIVE EXAMPLE 11A*

A dry blend of 75 parts of polyphenylene ether (0.46 IV) and 25 parts of polystyrene (Huntsman ® 1897) is mixed, extruded at 580° F. set and 638° F. melt, pelletized, and molded at 590° F. set, 627° F. melt, and 190° F. mold. Izod bars are tested, and flammability tests are conducted. Properties are summarized in Table 3.

EXAMPLE 12

A dry blend of 50 parts of polyphenylene ether (0.46 IV), 45 parts of polystyrene (Huntsman ® 1897) and 5 parts of CSiM modifier ((Si/PS)-S wt. ratio of 70:30) prepared by the method of Procedure A is mixed, extruded at 565° F. set, pelletized, and molded at 520° F. set, 566° F. melt, and 165° F. mold. Izod bars are tested, and flammability tests are conducted. Mottling and delamination are not seen. Properties are summarized in Table 3.

COMPARATIVE EXAMPLE 12A*

A dry blend of 50 parts of polyphenylene ether (0.46 IV) and 50 parts of polystyrene (Huntsman ® 1897) is mixed, extruded at 565° F. set and 614° F. melt, pelletized, and molded at 520° F. set, 562° F. melt, and 165° F. mold. Izod bars are tested, and flammability tests are conducted. Properties are summarized in Table 3.

As evidenced by Examples 11 and 12, the addition of CSiM to a polyphenylene ether/polystyrene blend improves impact resistance and enhances flame retardancy while maintaining other properties at desirable levels.

TABLE 3

Evaluation of CSiM in PPE/PS Blends

| Example | 11 | 11A* | 12 | 12A* |
|---|---|---|---|---|
| PPE (0.46 IV) | 75 | 75 | 50 | 50 |
| PS $^A$ | 20 | 25 | 45 | 50 |
| CSiM $^B$ | 5 | — | 5 | — |
| Izod $^C$ | 2.4 | 1.1 | 2.5 | 1.8 |
| DYN Efract $^D$ | 253 | 119 | 398 | 482 |
| FC $^E$ | 11.5 | 14.0 | 10.5 | 10.5 |
| UL94 ⅛" $^F$ | | | | |
| Avg | 6.2 | 13.8 | 21.6 | Burns |
| Max | 18 | 25 | 31 | — |
| Rating | V1 | V1 | Fails | Fails |
| UL94 1/16" $^F$ | | | | |
| Avg | 9.5 | 19.4 | Burns | Burns |
| Max | 16 | 38 | — | — |
| Rating | V1 | Fails | Fails | Fails |
| HDT $^G$ | 303 | 297 | 256 | 253 |
| TYS $^H$ | 9760 | 10770 | 7990 | 8530 |
| TE $^I$ | 31 | 25 | 34 | 29 |
| Extrusion | | | | |
| Extruder | 28 mm WP | | 28 mm WP | |
| Set Temp. (°F.) | 580 | 580 | 565 | 565 |
| Melt Temp. (°F.) | — | 638 | — | 614 |
| Molding Molder | 4 oz. Newb. | | 4 oz. Newb. | |
| Set Temp. (°F.) | 590 | 590 | 520 | 520 |
| Melt Temp. | 636 | 627 | 566 | 562 |

TABLE 3-continued

Evaluation of CSiM in PPE/PS Blends

| Example | 11 | 11A* | 12 | 12A* |
|---|---|---|---|---|
| (°F.) | | | | |
| Mold Temp. (°F.) | 190 | 190 | 165 | 165 |

[A] Huntsman ® 1897 Grade High Impact Polystyrene
[B] (Si/PAS)-S wt. ratio of 70:30, Procedure A
[C] Notched Izod Impact Strength (ft-lbs/in) 1/8" × 1/2" × 2 1/2" specimen (ASTM D-256)
[D] Drop-Dart Energy to Fracture (in - lbs) 1/8" × 4" disc specimen (ASTM D-3763)
[E] Flow Channel Length at molding temperature and 10,000 psi pressure (in) 1/8" × 1/4" × length mold (GE method)
[F] Average Self Extinguishing Time (sec), Maximum Flameout Time (sec), V-Rating 1/8" × 1/2" × 5" and 1/16" × 1/2" × 5" specimen (Underwriter's Laboratories Bulletin 94)
[G] Heat Deflection Temperature (°F.) 1/8" × 1/2" × 5" specimen (ASTM D-648)
[H] Tensile Yield Strength (psi) 1/8" × 8 1/2" ASTM tensile specimen (ASTM D-638)
[I] Tensile Elongation at Break % 1/8" × 3 1/2" ASTM tensile specimen (ASTM D-638)
**Supplied as pellets

EXAMPLE 13

A dry blend of 67.5 parts of polyphenylene ether, 22.5 parts of polystyrene and 10 parts of CSiM modifier ((Si/PS)-S wt. ratio of 70:30) prepared by the method of Procedure A is mixed, extruded, pelletized and molded. Mottling and delamination are not seen. Properties are summarized in Table 4.

EXAMPLE 14

The procedure of Example 13 is followed substituting a dry blend of 45 parts of polyphenylene ether, 45 parts of polystyrene and 10 parts of CSiM modifier ((Si/PS)-S wt. ratio of 70:30) prepared by the method of Procedure A. Mottling and delamination are not seen. Properties are summarized in Table 4.

COMPARATIVE EXAMPLE 14A*

The procedure of Example 13 is followed substituting a dry blend of 22.5 parts of polyphenylene ether, 67.5 parts of polystyrene and 10 parts of CSiM modifier ((Si/PS)-S wt. ratio of 70:30) prepared by the method of Procedure A. Mottling and delamination are not seen. Properties are summarized in Table 4.

COMPARATIVE EXAMPLE 14B*

The procedure of Example 13 is followed substituting a dry blend of 70 parts of polystyrene, no polyphenylene ether, and 30 parts of CSiM modifier ((Si/PS)-S wt. ratio of 70:30) prepared by the method of Procedure A. Mottling and delamination are seen. Properties are summarized in Table 4.

As evidenced by Examples 13 and 14 and Comparative Examples 14A* and 14B*, tensile yield strength and impact strength appear to begin to drop off as the ratio of PPE:PS goes from 50:50 to 25:75, and finally, in the absence of PPE, the CSiM of Procedure A is ineffective as a modifier.

TABLE 4

Compositions of Varying Amounts of Polyphenylene Ether and Polystyrene with CSiM

| Example | 13 | 14 | 14A* | 14B* |
|---|---|---|---|---|
| PPE | 67.5 | 45.0 | 22.5 | — |
| PS | 22.5 | 45.0 | 67.5 | 70 |
| CSiM [A] | 10 | 10 | 10 | 30 |
| Izod [B] | 5.55 | 2.38 | 1.28 | 0.97 |
| TYS [C] | 8998 | 8770 | 7746 | 2452 |
| TE [D] | 137 | 92 | 34 | 23 |
| TB [E] | 9413 | 7836 | 6598 | 3606 |

[A] (Si/PS)-S wt. ratio of 70:30, Procedure A
[B] Notched Izod Impact Strength (ft-lbs/in) 1/8" × 1/2" × 2 1/2" specimen (ASTM D-256)
[C] Tensile Yield Strength (psi) 1/8" × 8 1/2" ASTM tensile specimen (ASTM D-638)
[D] Tensile Elongation at Break % 1/8" × 8 1/2" ASTM tensile specimen (ASTM D-638)
[E] Tensile Strength at Break (psi) 1/8" × 8 1/2" ASTM tensile specimen (ASTM D-638)

In the foregoing examples, the degree of swelling can be determined in the following fashion:

A prepared polyorganosiloxane-based latex is coagulated by adding it to about four times its volume of methanol and water (1:1 volume ratio) containing 1 wt. percent $MgSO_4$. The precipitated rubber is washed and vacuum-dried at 70° C. overnight. Approximately 1 g of the dry silicone-based rubber is immersed in 100 ml toluene for 20 to 24 hours at ambient temperature and allowed to swell. The excess toluene is separated by decantation. The swelled polymer is vacuum-dried at 60° C. overnight, and the resulting polymer is weighed. The degree of swelling is calculated as: DS = ((weight of swelled polymer) − (weight of dry polymer)) divided by (weight of dry polymer).

Graft Efficiency can be determined by weighing dry multi-stage polyorganosiloxane-based graft polymer in a weighed thimble which is Soxhlet extracted by methyl ethylketone (MEK) for 20 to 22 hours. After vacuum-drying, the residue of MEK extraction is weighed. The graft efficiency is calculated as: GF (%) = ((weight of grafted monomer(s)) × 100) divided by (weight of total monomer(s) polymerized).

All patents and applications mentioned above are hereby incorporated by reference.

Many variations of the present invention will suggest themselves to those skilled in this art in light of the above, detailed description. All such obvious variations are within the full intended scope of the appended claims.

We claim:

1. A composition comprising a polyphenylene ether resin (A) or a mixture (A-1) comprising (i) a polyphenylene ether resin and (ii) a polystyrene resin wherein said polyphenylene ether resin (i) comprises at least 35 parts by weight based upon 100 parts by weight of (i) and (ii) combined; and an effective impact strength, weld line strength, flame resistance, surface appearance, moldability or flowability modifying amount of a multi-stage polyorganosiloxane/polyvinyl-based graft polymer composition (B) comprising (a) as a first stage, a substrate selected from
 (i) a polymeric co-homopolymerized substrate comprised of, in combination, an organosiloxane polymer and at least one vinyl polymer;
 (ii) a polymeric co-homopolymerized substrate comprised of, in combination, an organosiloxane polymer, at least one vinyl-based polymer, and units which are derived from a cross-linking agent or agents;
 (iii) a polymeric co-homopolymerized substrate comprised of, in combination, an organosiloxane polymer, at least one vinyl-based polymer, and units which serve as a graft-linking agent or agents;

(iv) a polymeric co-homopolymerized substrate comprised of, in combination, an organosiloxane polymer, at least one vinyl-based polymer, units which are derived from a cross-linking agent or agents and units from the same or different agent or agents which serve as a graft-linking agent or agents; or (v) a polymeric co-homopolymerized substrate comprised of, in combination, an organosiloxane polymer, at least one vinyl-based polymer, and a mixture of any of units which are derived from across-linking agent or agents, units which serve as a graft-linking agent or agents, or units derived from a cross-linking agent or agents and units from the same or different agent or agents which serve as a graft-linking agent or agents; and (b) at least one subsequent stage or stages graft polymerized in the presence of any previous stage and which is comprised of a vinyl-based polymer.

2. A composition as defined in claim 1 wherein components (A) or (A-1) comprise from about 95 to about 50 parts by weight and component (B) comprises from about 5 to about 50 parts by weight per 100 parts by weight of (A) or (A-1) and (B) combined.

3. A composition as defined in claim 1 wherein components (A) or (A-1) comprise from about 95 to about 75 parts by weight and component (B) comprises from about 5 to about 25 parts by weight per 100 parts by weight of (A) or (A-1) and (B) combined.

4. A composition as defined in claim 1, wherein components (A) or (A-1) comprise from about 95 to about 85 parts by weight and component (B) comprises from about 5 to about 15 parts by weight per 100 parts by weight of (A) or (A-1) and (b) combined.

5. A composition as defined in claim 1 wherein the mixture (A-1) comprise (i) a polyphenylene ether resin and (ii) a polystyrene resin wherein said polyphenylene ether resin (i) comprises at least 50 parts by weight per 100 parts by weight of (i) and (ii) combined.

6. A composition as defined in claim 1 wherein said organosiloxane/vinyl-based co-homopolymer first stage substrate (B)(a) comprises approximately 5 to 95 weight percent of the total graft polymer composition based upon the weight of said first stage substrate and any subsequent graft stage or stages taken together.

7. A composition as defined in claim 6 wherein said first stage substrate (B)(a) comprises approximately 30 to 90 weight percent of the total graft polymer composition.

8. A composition as defined in claim 1 wherein said first stage substrate (B) (a) is comprised of approximately 3 to 97 weight percent organosiloxane-based polymer and correspondingly approximately 97 to 3 weight percent vinyl-based polymer.

9. A composition as defined in claim 8 wherein said first age substrate (B)(a) is comprised of approximately 5 to 45 weight percent of vinyl-based polymer.

10. A composition as defined in claim 1 wherein said organosiloxane polymer is comprised primarily of a mixture of units of the formula

$R_nSiO_{(4-n)/2}$ wherein R is hydrogen or a monovalent hydrocarbon radical of about 1 to 16 carbon atoms and n is 0, 1 or 2.

11. A composition as defined in claim 1 wherein said vinyl-based polymer component of said first stage substrate (B)(a) is comprised primarily of polymerized alkenyl aromatic units, (meth)acrylate units or a mixture thereof.

12. A composition as defined in claim 11 wherein said vinyl-based polymer component of said first stage substrate (B)(a) comprises polystyrene.

13. A composition as defined in claim 11 wherein said vinyl-based polymer component of said first stage substrate is comprised primarily of divinylbenzene units and other alkenyl aromatic units.

14. A composition as defined in claim 1 wherein said vinylbased polymer in any subsequent stage (B)(b) includes monomers comprising an alkenyl aromatic compound or a copolymer thereof with a minor proportion of a (meth)acrylate compound, a vinyl cyanide compound, a maleimide compound, an acrylamide compound or a mixture of any of the foregoing.

15. A composition as defined in claim 14 wherein said vinyl-based polymer in any subsequent stage (B)(b) is selected from the group consisting of polystyrene and styrene/divinylbenzene copolymer.

16. A composition as defined in claim 1 wherein in component (B) said subsequent stages comprise
(b)(i) a second stage comprising at least one polymer and optionally units derived from a cross-linking agent or agents, units which serve as a graft-linking agent or agents, units derived from a cross-linking agent or agents and units of the same or different agent or agents which serve as a graft-linking agent or agents, or a mixture of any of the foregoing; and
(b)(ii) a third stage comprising at least one vinyl-based polymer which is the same as, or different than, said (b)(i) polymer.

17. A composition as defined in claim 16 wherein the ratio of first stage substrate (B)(a) to second stage polymer (b)(i) is 10:90 to 90:10 by weight based upon 100 parts by weight of (B)(a) and (b)(i) combined and the amount of third stage polymer (b)(ii) comprises from about 10 to about 90 parts by weight per 100 parts by weight of (B)(a), (b)(i) and (b)(ii) combined.

18. A composition as defined in claim 16 wherein subsequent stage (b)(i) comprises a cross-linked acrylate polymer and subsequent stage (b)(ii) comprises a styrenic polymer.

19. A composition as defined in claim 1 wherein said polyphenylene ether resin is a homopolymer or a copolymer of the general formula

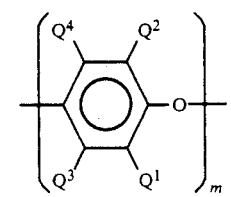

wherein $Q^1$ through $Q^4$ are selected independently from each other from the group consisting of hydrogen and hydrocarbon radicals and m is a number of 30 or more.

20. A composition as defined in claim 16 wherein said polyphenylene ether resin is a homopolymer or a copolymer of the general formula

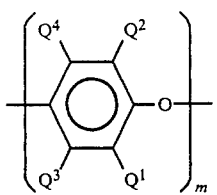

wherein $Q^1$ through $Q^4$ are selected independently from each other from the group consisting of hydrogen and hydrocarbon radicals and m is a number of 30 or more.

21. A composition as defined in claim 1 wherein said polyphenylene ether resin comprises poly(2,6-dimethyl-1,4-phenylene)-ether, a copolymer of (2,6-dimethyl-1,4-phenylene)ether with (2,3,6-trimethyl-1,4-phenylene)ether, or a mixture thereof.

22. A composition as defined in claim 16 wherein said polyphenylene ether resin comprises poly(2,6-dimethyl-1,4-phenylene)ether, a copolymer of (2,6-dimethyl-1,4-phenylene)ether with (2,3,6-trimethyl-1,4-phenylene)ether, or a mixture thereof.

23. A composition as defined in claim 1 wherein said polystyrene resin is a polymer derived from an aromatic vinyl monomer of the general formula

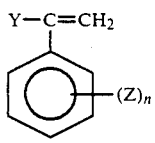

wherein Y is hydrogen or an alkyl of 1 to 4 carbon atoms, Z is a halogen or an alkyl of 1 to 4 carbon atoms, and n is either 0 or a number from 1 to 4; or said resin is a copolymer derived from at least 50 percent by weight of said aromatic vinyl monomer and another vinyl monomer copolymerizable therewith.

24. A composition as defined in claim 16 wherein said polystyrene resin is a polymer derived from an aromatic vinyl monomer of the general formula

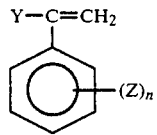

wherein Y is hydrogen or an alkyl of 1 to 4 carbon atoms, Z is a halogen or an alkyl of 1 to 4 carbon atoms, and n is either 0 or a number from 1 to 4; or said resin is a copolymer derived from at least 50 percent by weight of said aromatic vinyl monomer and another vinyl monomer copolymerizable therewith.

25. A composition as defined in claim 23 wherein said polystyrene resin comprises polystyrene, high impact polystyrene or a mixture thereof.

26. A composition as defined in claim 24 wherein said polystyrene resin comprises polystyrene, high impact polystyrene or a mixture thereof.

27. A composition as defined in claim 1 which also includes
  (C) an effective amount of a flame retardant agent.

28. A composition as defined in claim 16 which also includes
  (C) an effective amount of a flame retardant agent.

29. A composition as defined in claim 27 wherein said flame retardant agent comprises a phosphorus ester compound.

30. A composition as defined in claim 28 wherein said flame retardant agent comprises a phosphorus ester compound.

31. A composition as defined in claim 1 which also includes
  (D) an effective amount of a reinforcing filler.

32. A composition as defined in claim 16 which also includes
  (D) an effective amount of a reinforcing filler.

33. A composition as defined in claim 1 which also includes
  (E) an amount of silicone fluid effective to modify further, impact strength, flowability or flame resistance.

34. A composition as defined in claim 16 which also includes
  (E) an amount of silicone fluid effective to modify further, impact strength, flowability or flame resistance.

35. A composition as defined in claim 33 wherein said silicone fluid comprises a methylphenyl silicone fluid high in phenyl content.

36. A composition as defined in claim 34 wherein said silicone fluid comprises a methylphenyl silicone fluid high in phenyl content.

37. A composition as defined in claim 1 which also includes
  (C) an effective amount of a flame retardant agent;
  (D) an effective amount of a reinforcing filler; or
  (E) an amount of silicone fluid effective to modify further, impact strength, flowability, or flame resistance; or any combination of the foregoing.

38. A composition as defined in claim 16 which also includes
  (C) an effective amount of flame retardant agent;
  (D) an effective amount of reinforcing filler; or
  (E) an amount of silicone fluid effective to modify further, impact strength, flowability or flame resistance; or any combination of the foregoing.

39. An article molded from a resin composition as defined in claim 1.

40. An article molded from a resin composition as defined in claim 16.

41. An article extruded from a resin composition as defined in claim 1.

42. An article extruded from a resin composition as defined in claim 16.

43. An article thermoformed from a resin composition as defined in claim 1.

44. An article thermoformed from a resin composition as defined in claim 16.

* * * * *